United States Patent [19]

Mizuhara et al.

[11] 3,881,148

[45] Apr. 29, 1975

[54] POWER SUPPLY FOR ELECTRICAL PROCESSING APPARATUS

[75] Inventors: Yasushi Mizuhara, Kamakura; Takashi Kikumoto, Kawasaki; Tsuwao Abe, Kawasaki; Hiroyuki Hitomi, Kawasaki; Masayasu Ochiai, Kawasaki; Tuguaki Itoh, Kawasaki, all of Japan

[73] Assignee: Hitachi Seiko Ltd., Tokyo, Japan

[22] Filed: Nov. 28, 1972

[21] Appl. No.: 310,143

[30] Foreign Application Priority Data

Nov. 29, 1971  Japan.................. 46-95313

[52] U.S. Cl.............................. 321/47; 219/131
[51] Int. Cl.............................. H02m 7/40
[58] Field of Search....... 219/131 R, 131 W; 321/47

[56] References Cited
UNITED STATES PATENTS

| | | | |
|---|---|---|---|
| 2,880,374 | 3/1959 | Mulder................. | 219/131 WR X |
| 3,356,928 | 12/1967 | Parrish................. | 219/131 R X |
| 3,364,334 | 1/1968 | Sato et al............. | 219/131 R |
| 3,459,919 | 8/1969 | Manz et al........... | 219/131 R |
| 3,511,966 | 5/1970 | Bone.................... | 219/131 R |
| 3,705,290 | 12/1972 | Jones................... | 321/47 X |
| 3,720,868 | 3/1973 | Lee...................... | 321/47 |

*Primary Examiner*—R. N. Envall, Jr.
*Attorney, Agent, or Firm*—Craig & Antonelli

[57] ABSTRACT

A power supply for an electrical processing apparatus of the kind having means for applying electrical power across the work gap between an electrode and a workpiece disposed opposite to each other, means for supplying an electrolyte to the work gap, and means for moving the electrode and workpiece toward each other in their relative positions thereby processing the workpiece into a desired shape. The power supply comprises transformer means and rectifying means for obtaining the electrical power, means for holding the peak value of the output voltage of the rectifying means in the form of a d.c. voltage, and means for renewing the d.c. voltage in such a manner that a d.c. voltage level is established in the voltage holding means corresponding to the peak values of successive waveform portions whereby the peak value of the required working voltage can be reduced, undesirable spark discharge between the electrode and the workpiece can be prevented, and the precision of electrical processing can be remarkably improved.

10 Claims, 13 Drawing Figures

FIG. 2a
FIG. 2b
FIG. 3a
FIG. 3b
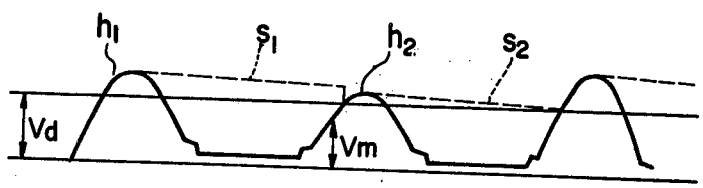
FIG. 4

POWER SUPPLY FOR ELECTRICAL PROCESSING APPARATUS

This invention relates to a power supply for electrical processing apparatus.

In a prior art electrical processing apparatus of the kind in which means are provided for applying electrical power across the work gap between an electrode and a workpiece disposed opposite to each other, supplying an electrolyte to the work gap, and moving the electrode and the workpiece toward each other or moving one of the electrode and the workpiece toward the other for forming the workpiece into a desired shape, it has been proposed to obtain a voltage of pulsating waveform by full-wave rectification of a single-phase a.c. voltage by means of diodes and to apply the voltage of pulsating waveform thus obtained across the electrode and the workpiece. However, such a power supply has been defective in that an undesirable reduction in the voltage across the electrode and the workpiece, hence a remarkable deterioration of the precision of electrical processing occurs frequently when the working current flowing between the electrode and the workpiece increases depending on the increase in the area of the workpiece and electrode disposed opposite to each other on opposite sides of the work gap.

In a power supply of this kind, it has been further proposed to apply across the electrode and the workpiece a voltage obtained by rectifying a singlephase a.c. voltage by thyristors such as silicon controlled rectifier elements so that, in response to the increase in the working current depending on the increase in the electrically processed area, the firing angle of the thyristors can be reduced to prevent an undesirable reduction in the mean voltage across the electrode and the workpiece. In such a power supply, however, the firing angle of the thyristors is generally controlled within the range of 60° to 120° to provide a peak voltage of a high level in order to sufficiently eliminate variations of the voltage across the electrode and the workpiece corresponding to variations of the working current flowing between the electrode and the workpiece. The power supply of this kind has been defective in that the precision of electrical processing is extremely reduced due to the fact that spark discharge tends to occur across the electrode and the workpiece through the medium of sludge produced during the electrical processing of the workpiece and the workpiece is melted more than is required due to the spark discharge.

It is a primary object of the present invention to provide a power supply for an electrical processing apparatus of the kind having means for carrying out fullwave rectification of an a.c. voltage and applying the electrical power thus obtained across, as indicated in FIG. 1, the work gap between an electrode and a workpiece disposed opposite to each other, means for supplying an electrolyte to the work gap, and means for moving the electrode and the workpiece toward each other or moving one of the electrode and the workpiece toward the other for processing the workpiece into a desired shape, said power supply comprising transformer means for reducing the voltage of a commercial a.c. source to a predetermined voltage, rectifying means for carrying out full-wave rectification of the a.c. voltage induced in the secondary side of said transformer means, voltage holding means for holding the peak value of the output voltage of said rectifying means in the form of a d.c. voltage, and means for renewing the d.c. voltage held in said voltage holding means in the manner so that a first d.c. voltage level established in said voltage holding means and corresponding to the peak value of a first waveform portion of the output voltage of said rectifying means is cancelled immediately before a momentary value of a second waveform portion following said first waveform portion attains the peak value thereof and a second d.c. voltage level corresponding to the peak value of said second waveform portion is established in said voltage holding means.

The foregoing object and other objects as well as the characteristic features of the present invention will become more apparent and more readily understandable by the following description and the appended claims when read in conjunction with the accompanying drawing, in which:

FIGS. 2 to 5 show waveforms appearing at various portions of the power supply according to the present invention.

Figure 1:
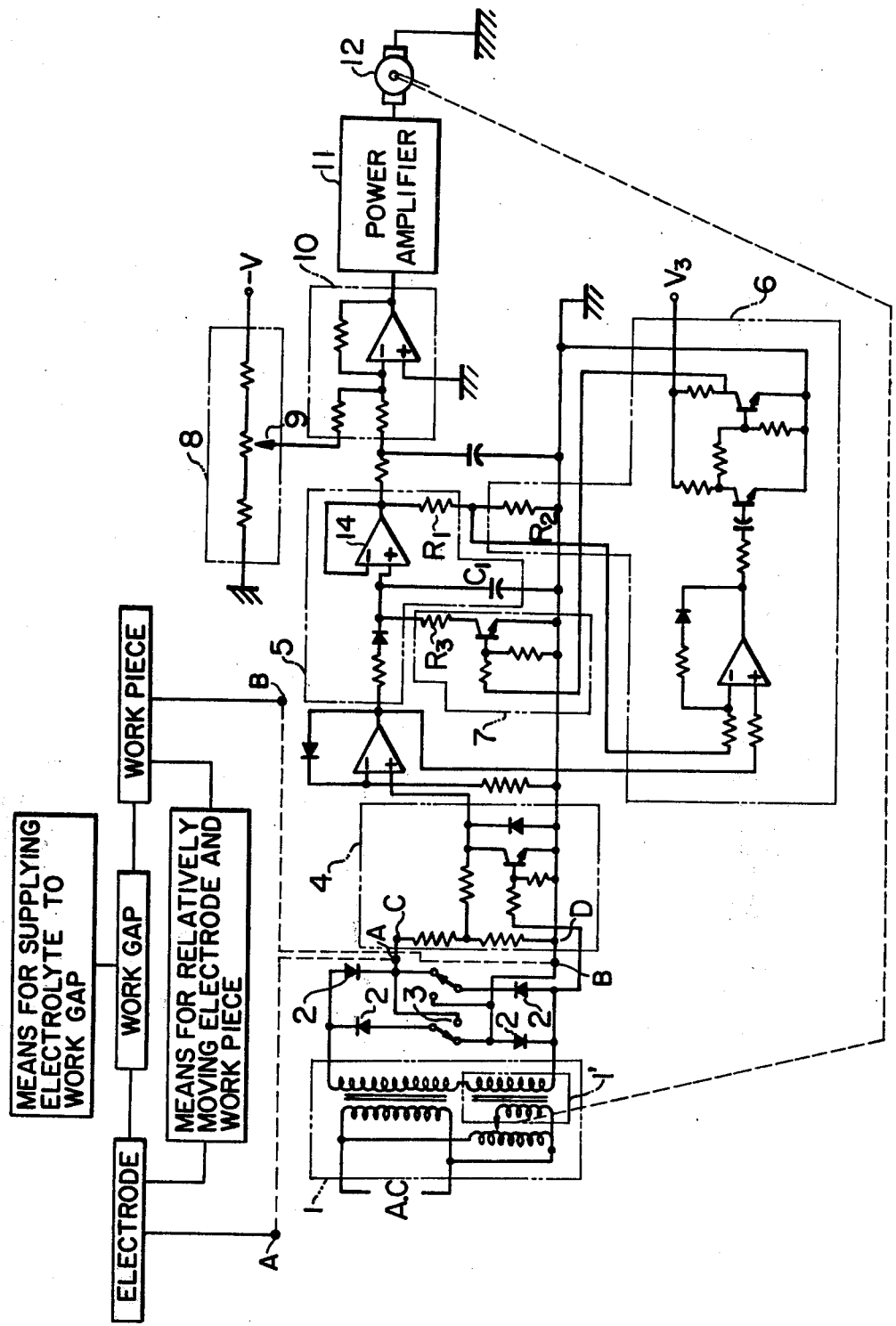
FIG. 1 is a schematic view of an electrical processing apparatus which adopts a circuit diagram of a preferred embodiment of the present invention.

Referring to FIG. 1, a variable a.c. voltage is applied across the primary winding of a transformer 1 so that the a.c. voltage induced in the secondary winding of the transformer 1 is freely adjustable. Four diodes 2 are connected across the secondary winding of the transformer 1 for rectifying the a.c. voltage induced in the secondary winding of the transformer 1. These four diodes 2 are selectively connected by a switch 3 so as to selectively obtain across a pair of output terminals A and B a voltage of full-wave rectified waveform as shown in FIG. 2a and a voltage of a.c. waveform as shown in FIG. 2b. The arrangement for obtaining the latter output by the inverse parallel circuits of the diodes 2 is provided for reducing the regulating voltage range of a regulating transformer 1'. A waveform converting circuit 4 acts to eliminate the half cycle portion ($\pi$) in each cycle ($2\pi$) of the waveform of the output voltage of the rectifying circuit consisting of the diodes 2 so that a voltage waveform as shown in FIG. 3a or 3b can appear at the output of the circuit 4 in response to the application of the voltage of the full-wave rectified waveform or a.c. waveform across the input terminals C and D thereof. A peak value holding circuit 5 acts to hold the peak value of the output voltage of the waveform converting circuit 4 in the form of a d.c. voltage in the from shown in FIG. 5F. The voltage waveform delivered from the waveform converting circuit 4 includes successive waveform portions, such as first waveform portion $h_1$ corresponding to a d.c. voltage $S_1$ held in the peak value holding circuit 5 and second waveform portion $h_2$ following the first waveform portion $h_1$. The second waveform portion $h_2$ corresponds to a second d.c. voltage $S_2$, as shown in FIG. 4. When a momentary value of voltage designated by vn, such as that of the waveform portion $h_2$, coincides with a voltage Vd, a signal appears at the output of a timing circuit 6. The voltage Vd is obtained as a voltage drop across a resistor $R_2$ by dividing the output voltage of the amplifier 14 by a voltage dividing circuit of resistors $R_1$ and $R_2$. A peak value renewing circuit 7 acts to successively renew the d.c. voltage held in the peak value holding circuit 5 as $S_1, S_2, \ldots S_n$ in response to the signal applied from the timing circuit 6. A reference peak voltage source 8 includes a variable resistor 9 which is suitably adjusted so as to establish a reference peak voltage of any desired value lying within the output voltage range of the regulating transformer 1'. A differential amplifier 10 compares the d.c. voltage ($S_1, S_2, \ldots S_n$) held in the peak value holding circuit 5 with a predetermined reference peak voltage applied from the reference peak voltage source 8 with the reference peak voltage having a negative polarity, as shown in FIG. 1, and amplifies the difference between these two voltages for delivering such an amplified difference voltage. The difference between these two voltages consequently corresponds to the sum of the d.c. voltage held in the peak value holding circuit 5 and the negative value of the reference peak voltage applied from the reference peak voltage source 8. A power amplifier 11 amplifies the output voltage of the differential amplifier 10 for applying such an amplified voltage to a means such as a d.c. servomotor 12. In response to the application of the electrical power from the power amplifier 11, the d.c. servomotor 12 is rotated depending on the voltage level and polarity of the electrical power to vary the voltage applied across the primary winding of the transformer 1. An electrode and a workpiece are connected to the positions A and B respectively in FIG. 1.

The operation of the embodiment of the present invention will now be described sequentially with reference to FIGS. 1 and 5.

Figure 5A:
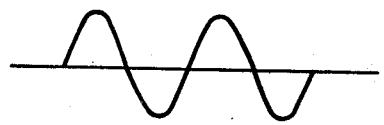

1. An a.c. voltage having a commercial frequency is reduced to a desired voltage by the transformer 1. The a.c. voltage induced in the secondary winding of the transformer 1 has a waveform as shown in FIG. 5a.

Figure 5B:
Figure 5C:
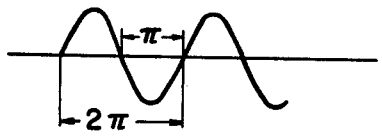

2. The a.c. voltage induced in the secondary winding of the transformer 1 is rectified by the four diodes 2 to obtain a voltage having a pulsating waveform as shown in FIG. 5b, or it is merely passed through the diodes 2 to obtain a voltage of a.c. waveform as shown in FIG. 5c. Such a voltage is applied across the electrode and the workpiece.

Figure 5D:
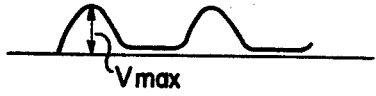
Figure 5E:
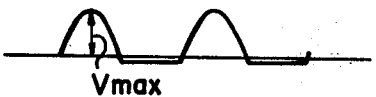

3. The voltage having a waveform as shown in FIG. 5b or 5c is applied from the rectifying circuit consisting of the diodes 2 to the waveform converting circuit 4 in which the half cycle portion in each cycle ($2\pi$) of the waveform shown in FIG. 5b or 5c is eliminated to be converted into a waveform as shown in FIG. 5d or 5e.

Figure 5F:
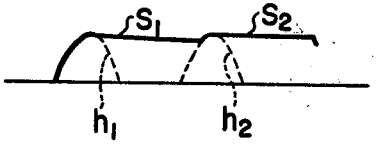

4. The voltage having a waveform as shown in FIG. 5d or 5e is applied from the waveform converting circuit 4 to the peak value holding circuit 5 in which the peak voltage $V_{max}$ of the waveform shown in FIG. 5d or 5e is held in a capacitor $C_1$ in the form of a d.c. voltage $S_1$ as shown in FIG. 5f. When the voltage obtained by dividing the d.c. voltage $S_1$ held in the capacitor $C_1$ by the two resistors $R_1$ and $R_2$ coincides with a momentary voltage $Vm$ of a waveform portion $h_2$ respectively following the waveform portion $h_1$ corresponding to the d.c. voltage $S_1$ held in the capacitor $C_1$, a signal appears at the output of the timing circuit 6 to be applied to the peak value renewing circuit 7. In the peak value renewing circuit 7, the charge stored in the capacitor $C_1$ in the peak value holding circuit 5 is discharged through a resistor $R_3$ for a very short period of time so as to reduce the peak value of the voltage held in the capacitor $C_1$. Consequently, a d.c. voltage $S_2$ corresponding to the peak value of the next waveform portion $h_2$ is now held in the capacitor $C_1$. Thus, the d.c. voltage held in the peak value holding circuit 5 is renewed each time the waveform portion is applied so as to hold the peak value of such waveform portion.

5. The d.c. voltage S held in the peak value holding circuit 5 is applied to the differential amplifier 10 to be compared with the reference peak voltage applied from the reference peak voltage source 8. When there is a difference between these two voltages, the difference voltage is amplified to appear at the output of the differential amplifier 10.

6. The amplified difference voltage is applied from the differential amplifier 10 to the power amplifier 11 to be subjected to power amplification.

7. The electrical power is applied from the power amplifier 11 to the d.c. servomotor 12. The d.c. servomotor 12 is rotated depending on the polarity of the applied voltage to vary the voltage applied across the primary winding of the transformer 1. Consequently, the a.c. voltage induced in the secondary side of the transformer 1 is varied and this voltage is applied to the differential amplifier 10 through the diodes 2, waveform converting circuit 4 and peak value holding circuit 5 to be compared with the reference peak voltage applied from the reference peak voltage source 8. When a.c. voltage induced in the secondary side of the transformer 1 is controlled so that the d.c. voltage applied from the peak value holding circuit 5 coincide with the reference peak voltage.

Figure 6:
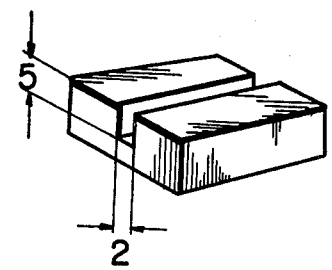
FIG. 6 is a perspective view of an electrically processed workpiece.

In the embodiment of the present invention above described, the d.c. voltage S held in the peak value holding circuit 5 is renewed at the time at which the momentary voltage of the waveform portion following the waveform portion corresponding to the d.c. voltage S held in the peak value holding circuit 5 attains a predetermined voltage level. However, a timing circuit which will generate a renewing signal with constant timing may be provided due to the fact that the period of the commercial a.c. voltage is constant.

an electrolytic grinding machine provided with a power supply embodying the present invention and another electrolytic grinding machine provided with a prior art power supply were used to grind a groove having a width of 2 mm and a depth of 5 mm as shown in FIG. 6. The grinding characteristics of these grinding machines are tabulated in the following table:

| Items | Power supply of present invention | Prior art power supply |
| --- | --- | --- |
| Waveform, | Single-phase a.c. voltage is full-wave rectified and constant voltage control is applied to peak value. | Firing timing of thyristors is regulated and constant voltage control is applied to mean voltage. |
| Electrode | Graphite | Graphite |
| Electrolyte | Aqueous solution containing 4 % $NaNO_3$ and 10 % $NaNO_2$ | Aqueous solution containing 4 % $NaNO_3$ and 10 % $NaNO_2$ |
| Material of workpiece | SKD11 | SKD11 |
| Table feed rate (mm/min) | 2.4 | 2.4 |
| Working voltage (V) Peak | 9 | 12 |
| Working voltage (V) Mean | 5.4 | 5.3 |
| Working current (A) | 40 | 60 |

-Continued

| Items | Power supply of present invention | Prior art power supply |
| --- | --- | --- |
| Precision of grinding (mm) | 0.005 | 0.02 |

The present invention provides the following advantages:

1. In the present invention, a single-phase a.c. voltage is full-wave rectified and the peak value of the rectified voltage is maintained constant. Thus, the same mean working voltage as that employed in the prior art power supply can be obtained with a peak voltage value which is lower than heretofore. This is advantageous in that undesirable spark discharge between the electrode and the workpiece can be prevented and the precision of electrical processing can be remarkably improved.

2. In the electrical processing of the same workpiece, an effective current value less than that required heretofore suffices to supply between the electrode and the workpiece the mean current of the same value as that employed in the prior art power supply. Thus, power consumption is less, economical processing can be attained, and the size of the power supply can be reduced.

3. In the present invention, the peak value of the working voltage across the electrode and the workpiece is compared with a predetermined reference peak voltage for the purpose of constant voltage control of the peak value. In this case, the peak value of the working voltage is held in the form of a d.c. voltage corresponding to the level of the peak value and the d.c. voltage held in this manner is cancelled to be renewed immediately before the voltage of a waveform portion following the waveform portion corresponding to the above-mentioned d.c. voltage attains its peak value. Thus, any variation of the peak value of the working voltage can be immediately detected and the constant voltage control of the peak value can be precisely and reliably attained.

4. In the present invention, the half wave portion ($\pi$) in each cycle ($2\pi$) of the voltage waveform delivered from the rectifying circuit is eliminated by the waveform converting circuit. Thus, the succeeding circuits can be operated under the same conditions without the need for provision of change-over means or any other special means irrespective as to whether the voltage having an a.c. waveform or the voltage having a pulsating waveform is delivered from the rectifying circuit.

What we claim is:

1. A power supply for an electrical processing apparatus of the kind having means for carrying out full-wave rectification of an a.c. voltage and applying the electrical power thus obtained across the work gap between an electrode and a workpiece disposed opposite to each other, means for supplying an electrolyte to the work gap, and means for moving the electrode and the workpiece toward each other or moving one of the electrode and the workpiece toward the other for processing the workpiece into a desired shape, said power supply comprising transformer means for reducing the voltage of a commercial a.c. source to a predetermined voltage, rectifying means for carrying out fullwave rectification on the a.c. voltage induced in the secondary side of said transformer means, voltage holding means for holding the peak value of the output voltage of said rectifying means in the form of a d.c. voltage, and means for renewing the d.c. voltage held in said voltage holding means in the manner so that a first d.c. voltage level established in said voltage holding means and corresponding to the peak value of a first waveform portion of the output voltage of said rectifying means is cancelled immediately before a momentary value of a second waveform portion following said first waveform portion attains the peak value thereof and a second d.c. voltage level corresponding to the peak value of said second waveform portion is established in said voltage holding means, whereby the output voltage of said rectifying means is controlled in response to the deviation of the d.c. voltage level established in said voltage holding means.

2. A power supply for an electrical processing apparatus of the kind having means for carrying out full-wave rectification of an a.c. voltage and applying the electrical power thus obtained across the work gap between an electrode and a workpiece disposed opposite to each other, means for supplying an electrolyte to the work gap, and means for moving the electrode and the workpiece toward each other or moving one of the electrode and the workpiece toward the other for processing the workpiece into a desired shape, said power supply comprising transformer means for reducing the voltage of a commercial a.c. source to a predetermined voltage, said transformer means being associated with means capable of regulating the voltage induced in the secondary side thereof, rectifying means for carrying out full-wave rectification of the a.c. voltage induced in the secondary side of said transformer means, voltage holding means for holding the peak value of the output voltage of said rectifying means in the form of a d.c. voltage, means for renewing the d.c. voltage held in said voltage holding means in the manner so that a first d.c. voltage level established in said voltage holding means and corresponding to the peak value of a first waveform portion of the output voltage of said rectifier means is cancelled immediately before a momentary value of a second waveform portion following said first wave portion attains the peak value thereof and a second d.c. voltage level corresponding to the peak value of said second waveform portion is established in said voltage holding means, means for comparing the d.c. voltage delivered from said renewing means with a predetermined reference voltage and delivering a voltage corresponding to the difference between these two voltages, and a motor adapted for rotation depending on the level and polarity of the voltage delivered from said comparing means thereby regulating the output voltage of said transformer means.

3. A power supply for an electrical processing apparatus of the kind having means for carrying out full-wave rectification of an a.c. voltage and applying the electrical power thus obtained across the work gap between an electrode and a workpiece disposed opposite to each other, means for supplying an electrolyte to the work gap, and means for moving the electrode and the workpiece toward each other or moving one of the electrode and the workpiece toward the other for processing the workpiece into a desired shape, said power supply comprising transformer means for reducing the voltage of a commercial a.c. source to a predetermined voltage, rectifying means including a plurality of rectifier elements and a switch for selectively changing over the connection between said rectifier elements so as to selectively derive a voltage having a full-wave rectified waveform and a voltage having an a.c. waveform from the output of said rectifying means, waveform converting means for eliminating the half cycle portion in each cycle ($2\pi$) of the voltage waveform delivered from said rectifying means, voltage holding means for holding the peak value of the output voltage of said waveform converting means in the form of a d.c. voltage, and means for renewing the d.c. voltage held in said voltage holding means in the manner so that a first d.c. voltage level established in said voltage holding means and corresponding to the peak value of a first waveform portion of the output voltage of said rectifying means is cancelled immediately before a momentary value of a second waveform portion following said first waveform portion attains the peak value thereof and a second d.c. voltage level corresponding to the peak value of said second waveform portion is established in said voltage holding means.

4. A power supply for an electrical processing apparatus of the kind having means for carrying out full-wave rectification of an a.c. voltage and applying the electrical power thus obtained across the work gap between an electrode and a workpiece disposed opposite to each other, means for supplying an electrolyte to the work gap, and means for moving the electrode and the workpiece toward each other or moving one of the electrode and the workpiece toward the other for processing the workpiece into a desired shape, said power supply comprising transformer means for reducing the voltage of a commercial a.c. source to a predetermined voltage, said transformer means being associated with means capable of regulating the voltage induced in the secondary side thereof, rectifying means including a plurality of rectifier elements and a switch for selectively changing over the connection between said rectifier elements so as to selectively derive a voltage having a full-wave rectified waveform and a voltage having an a.c. waveform from the output of said rectifying means, waveform converting means for eliminating the half cycle portion in each cycle ($2\pi$) of the voltage waveform delivered from said rectifying means, voltage holding means for holding the peak value of the output voltage of said waveform converting means in the form of a d.c. voltage, means for renewing the d.c. voltage held in said voltage holding means in the manner so that a first d.c. voltage level established in said voltage holding means and corresponding to the peak value of a first waveform portion of the output voltage of said rectifying means is cancelled immediately before a momentary value of a second waveform portion following said first waveform portion attains the peak value thereof and a second d.c. voltage level corresponding to the peak value of said second waveform portion is established in said voltage holding means, means for comparing the d.c. voltage delivered from said renewing means with a predetermined reference peak voltage and delivering a voltage corresponding to the difference between these two voltages, and a motor adapted for rotation depending on the level and polarity of the voltage delivered from said comprising means thereby regulating the output voltage of said transformer means.

5. In a power supply for an electrical processing apparatus of the type utilizing full-wave rectification of an a.c. voltage, said power supply comprising
voltage holding means for holding predetermined voltage values of rectified voltage waveforms in the form of a d.c. voltage, and
renewing means for renewing said d.c. voltage in said voltage holding means as a function of said predetermined voltage values of each of said rectified voltage waveforms, wherein said d.c. voltage corresponds to a peak value of each of said rectified voltage waveforms, and
wherein the d.c. voltage corresponding to the peak value of each of said rectified voltage waveforms is cancelled immediately before the peak value of the next successive rectified voltage waveform is attained.

6. A power supply according to claim 5, wherein said renewing means cancels the d.c. voltage corresponding to the peak value of each of said rectified voltage waveforms immediately before the peak value of the next successive rectified voltage waveform is attained.

7. In a power supply for an electrical processing apparatus of the type utilizing full-wave rectification of an a.c. voltage, said power supply comprising
transformer means for transforming an a.c. voltage to a predetermined voltage,
rectifying means for rectifying said predetermined voltage, said rectifying means providing full-wave rectification of said predetermined voltage,
comparison means for comparing a peak value of the rectified predetermined voltage in the form of a d.c. voltage with a predetermined reference voltage, said comparision means providing an output voltage corresponding to the difference between the compared voltages, and
regulating means associated with said transformer means for regulating the output of said transformer means as a function of said predetermined reference voltage depending on the level and polarity of the output voltage of said comparison means.

8. A power supply according to claim 7, wherein said power supply comprises
voltage holding means for holding said peak voltage values of rectified voltage waveforms in the form of a d.c. voltage, and
renewing means for renewing said d.c. voltage in said voltage holding means as a function of said peak voltage values of each of said rectified voltage waveforms.

9. A power supply according to claim 7, wherein said rectifying means includes a plurality of rectifying elements and a switch means for selectively providing a full-wave rectified voltage waveform and an a.c. voltage waveform.

10. A power supply according to claim 9, wherein waveform converting means are provided for eliminating half cycle portions of each cycle of said selectively provided full-wave rectified voltage waveform and a.c. voltage waveform.

* * * * *